US 8,200,436 B2

(12) United States Patent
Sato et al.

(10) Patent No.: US 8,200,436 B2
(45) Date of Patent: Jun. 12, 2012

(54) METHOD AND APPARATUS FOR WELLBORE SURVEY USING INERTIAL SENSORS

(75) Inventors: Shigeru Sato, Inagi (JP); Juei Igarashi, Yokohama (JP); Tsutomu Yamate, Yokohama (JP); Charles Woodburn, Clamart Cedex (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 367 days.

(21) Appl. No.: 12/503,075

(22) Filed: Jul. 15, 2009

(65) Prior Publication Data
US 2011/0015862 A1    Jan. 20, 2011

(51) Int. Cl.
G06F 19/00 (2006.01)
G01C 19/04 (2006.01)
(52) U.S. Cl. ............................................. 702/6; 33/321
(58) Field of Classification Search ................ 702/6, 92, 702/141, 150; 701/207, 220; 33/316, 321, 33/324
See application file for complete search history.

(56) References Cited

U.S. PATENT DOCUMENTS

| 4,706,388 A * | 11/1987 | Van Steenwyk ................ 33/304 |
| 6,315,062 B1 | 11/2001 | Alft et al. |
| 6,453,239 B1 | 9/2002 | Shirasaka et al. |
| 6,882,964 B2 | 4/2005 | Bayard et al. |
| 2006/0253253 A1 | 11/2006 | Reynolds et al. |
| 2010/0077623 A1 * | 4/2010 | Imamura et al. ................ 33/304 |

FOREIGN PATENT DOCUMENTS

WO    2005/100916    10/2005

* cited by examiner

Primary Examiner — Bryan Bui
(74) Attorney, Agent, or Firm — Jianguang Du; Brgitte Jeffery Echols; Jeff Griffin

(57) ABSTRACT

A sensor apparatus comprising a housing, two or three gyroscope units and three accelerometer units. The gyroscope units are oriented orthogonally respective to each other and mounted within the housing. Each gyroscope unit includes a plurality of gyroscopes with input axes parallel to each other. The accelerometer units are oriented orthogonally respective to each other and mounted within the housing. Each accelerometer unit includes a plurality of accelerometers with detection axes parallel to each other.

43 Claims, 16 Drawing Sheets

METHOD AND APPARATUS FOR WELLBORE SURVEY USING INERTIAL SENSORS

FIELD OF THE INVENTION

The present invention relates generally to methods and apparatuses for wellbore survey using inertial sensors such as gyroscopes and accelerometers. More specifically, some aspects disclosed herein are directed to methods and apparatuses of measurements for wellbore surveys such as wellbore trajectory measurements, azimuth measurements and navigation in boreholes during WireLine ("WL") logging operations, Logging-While-Drilling ("LWD") operations and Measurement-While-Drilling ("MWD") operations.

BACKGROUND OF THE INVENTION

Wellbore survey systems used for geological surveying and drilling of oil and gas wells generally map or plot the path of a wellbore by determining wellbore azimuth and wellbore inclination at various points along the borehole. "Azimuth" may be considered, for present purposes, to be the directional heading relative to a reference coordinate, such as north. "Borehole inclination" may be considered, also for present purposes, the deviation from the vertical.

In WL logging operations, a logging system (tool) is conveyed into a wellbore after drilling. The logging tool mounts some sensors such as gyroscopes, accelerometers and magnetometers. The gyroscopes and the accelerometers are used for continuous measurements of attitude of the logging tool with respect to the gravity direction at each position in the wellbore. The magnetometer is used for to continuous measurements of azimuth at each position of the logging tool in the wellbore. By processing data from the sensors, the attitude of the logging tool with respect to the gravity direction and azimuth at each position of the logging tool conveyed in the wellbore are determined. The total traveling distance of the logging tool from the entrance of wellbore is determined by measuring cable length between the logging tool and the wellbore-entrance. The trajectory of the logging tool traveling in the wellbore can be determined based on the continuously measured data of the attitude and total traveling distance of the logging tool.

In drilling operations such as LWD and MWD operations, it is important to monitor azimuth and inclination of a wellbore and continually determine the position: and direction of the drilling tool to drill the wellbore as planned prior to drilling. The well bore azimuth and wellbore inclination can be monitored by measuring attitude and azimuth of the drilling tool. For this monitoring, the inclination and azimuth of the drilling tool located in the drilled wellbore are measured by utilizing the above-mentioned sensors such as gyroscopes, accelerometers and magnetometers mounted in the drilling tool.

Some navigation systems for wellbore survey using gyroscopes and accelerometers have been disclosed. For example, a strapdown inertial navigation system is disclosed in U.S. Pat. No. 6,453,239, issued Sep. 17, 2002, to Schlumberger Technology Corporation as the assignee of the inventors Ichiro Shirasaka, et al. This system employs three accelerometers mounted within a housing and three vibrating mass, Coriolis effect gyroscopes rigidly mounted within the housing.

In the wellbore survey using the gyroscopes and accelerometers, it is difficult to obtain stable and accurate output from the sensors under the ground because of harsh environment such as high temperature. Therefore, there is a need for sensor apparatuses to perform accurate measurements of azimuth and inclination for wellbore survey using gyroscopes and accelerometers even if such sensors are used, for example, in oilfield and any other harsh environment.

As will become apparent from the following description and discussion, the present invention provides an improved sensor apparatus capable of operating stably and accurately in harsh environment such as high temperature.

BRIEF SUMMARY OF THE INVENTION

In one aspect of the present invention, a method of measuring azimuth for wellbore survey comprises moving a sensor apparatus in a wellbore. The sensor apparatus includes two or three gyroscope units oriented orthogonally respective to each other and three accelerometer units oriented orthogonally respective to each other. Each of the two or three gyroscope units has a plurality of gyroscopes with input axes parallel to each other and each of the three accelerometer units has a plurality of accelerometers with detection axes parallel to each other. A single output data is generated based on outputs from the plurality of gyroscopes included in each of the two or three gyroscope units and a single output data is generated based on outputs from the plurality of accelerometers included in each of the three accelerometer units, under stationary condition. Next, an azimuth of a target direction relative to north direction on a horizontal plane perpendicular to a gravity direction is determined based on the output data generated from the three accelerometer units and the output data generated from the two or three gyroscope units.

In another aspect of the present invention, a method of measuring attitude for wellbore survey comprises initializing a sensor apparatus under stationary condition. The sensor apparatus includes two or three gyroscope units oriented orthogonally respective to each other and three accelerometer units oriented orthogonally respective to each other. Each of the two or three gyroscope units has a plurality of gyroscopes with input axes parallel to each other and each of the three accelerometer units has a plurality of accelerometers with detection axes parallel to each other. The sensor apparatus is moved in a wellbore after initializing. A single output data is generated based on outputs from the plurality of gyroscopes included in each of the three gyroscope units and a single output data is generated based on outputs from the plurality of accelerometers included in each of the three accelerometer units. Next, three orthogonal, incremental velocities for the sensor apparatus are determined based on the output data generated from the three accelerometer units and three orthogonal, incremental rotation angles for the sensor apparatus are determined based on the output data generated from the three gyroscope units. Attitude and position of the sensor apparatus in the wellbore are determined based on the three incremental velocities and the three incremental rotation angles.

In yet another aspect, the invention is a sensor apparatus comprising a housing, two or three gyroscope units oriented orthogonally respective to each other, and three accelerometer units oriented orthogonally respective to each other. The gyroscope units are mounted within the housing and each of the gyroscope units includes a plurality of gyroscopes with input axes parallel to each other. The accelerometer units are mounted within the housing and each of the accelerometer units includes a plurality of accelerometers with detection axes parallel to each other.

In yet another aspect of the present invention, the disclosure provides a system for wellbore survey comprising a sensor apparatus, a controller for controlling the sensor apparatus, and a data processing unit for processing output data from the sensor apparatus. The sensor apparatus includes a housing, two or three gyroscope units oriented orthogonally respective to each other, and three accelerometer units oriented orthogonally respective to each other. The gyroscope units are mounted within the housing and each of the gyroscope units includes a plurality of gyroscopes with input axes parallel to each other. The accelerometer units are mounted within the housing and each of the accelerometer units includes a plurality of accelerometers with detection axes parallel to each other.

In understanding the scope of the present invention, the term "moving" as used herein means changing position and/or attitude, or causing to be in different position and/or attitude. The term "moving" also can be construed as including changing position and/or attitude such as pitching, rolling and yawing by conveying or maneuvering.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain principles of the present invention.

Figure 1:
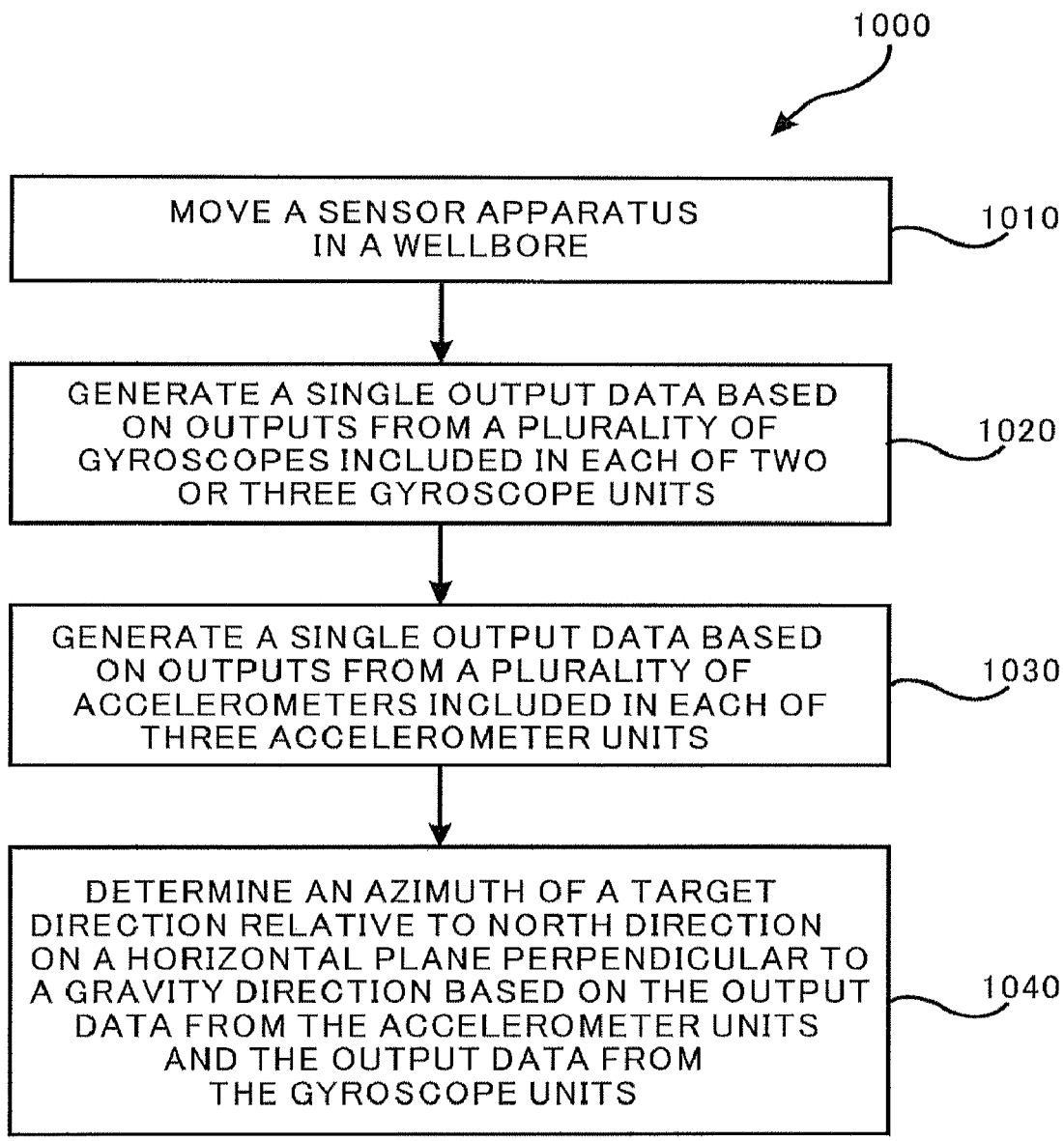
FIG. 1 is a flow chart of one exemplary method of measuring azimuth of a sensor apparatus according to the disclosure herein.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION OF THE INVENTION

Illustrative embodiments and aspects of the present disclosure are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having benefit of the disclosure herein.

In one of exemplary applications of a sensor apparatus according to the disclosure herein, a strap-down sensor apparatus is installed within a tool such as a wireline logging tool and a drilling tool used for oil field operations to determine the azimuth and trajectory of the tool in a wellbore. In the case of strap-down configuration, the sensor apparatus is rigidly fixed at a predetermined position of a body member such as a chassis of the tool. The sensor apparatus may be used in survey operations that can be classified as described in U.S. Pat. No. 6,453,239 which is incorporated herein by reference in its entirety. For example, the sensor apparatus according to the disclosure herein may be used survey operations classified as:

(i) multi-shot gyrocompassing along the wellbore in Logging-While-Drilling ("LWD") and Measurement-While-Drilling ("MWD");

(ii) multi-shot gyrocompassing along the wellbore in Wire-Line ("WL") logging;

(iii) Zero-velocity-UPdaTe ("ZUPT") correction to inertial navigation in LWD and MWD;

(iv) ZUPT correction to inertial navigation in WL logging;

(v) a continuous cable-aided inertial navigation in WL logging.

By utilizing the plural kinds of inertial sensors, the attitude and trajectory of a WL logging tool in the wellbore are determined in the survey operations, for example, as following procedures. Before conveying or maneuvering the logging tool into the wellbore from the wellbore entrance, initial data of latitude, longitude and depth (=0 m) at the wellbore entrance are input into a system for WL logging operations and an azimuth with respect to the coordinates defined on a predetermined reference face of the logging tool is measured at the wellbore entrance under a stationary condition of the logging tool. The measured azimuth data is also input into the system. After starting downward movement of the logging tool, attitude of the logging tool with respect to the gravity direction, azimuth and cable length are continuously measured at each point in the wellbore. The attitude is determined based on the outputs from the gyroscopes and accelerometers. For determining the azimuth, the magnetometers and gyroscopes are switched to each other according to the situation. The magnetometers are mainly used for the azimuth measurements, and the gyroscopes are used when the magnetometers are unusable under specific situation such as the location inside or near a metal casing. Each measurement using the gyroscopes is performed under a stationary condition of the logging tool. Each data measured with the sensors is stored in a memory in the logging tool and/or transmitted over armored cable to supply to a processor on the ground. By processing data from the sensors, the attitude of the logging tool with respect to the gravity direction and azimuth at each position of the logging tool conveyed or maneuvered in the wellbore. The total traveling distance of the logging tool from the wellbore entrance is determined based on data of the cable length between the logging tool and the wellbore-entrance. The trajectory of the logging tool traveling in the wellbore can be determined based on the continuously measured data of the attitude and total traveling distance of the logging tool. The logging tool may be stopped at predetermined timing to measure bias error of the sensors and azimuth under a stationary condition. The measured data of the bias error are used for correction of output data from the sensors. The timing for measurements of bias error may be determined based on the desired total accuracy of attitude and trajectory measurements and the maximum bias error among the sensors. The measurements for determination of the attitude and trajectory may be performed while the logging tool is moving upward from the bottom of wellbore as well as moving downward so as to obtain double data for the same wellbore and improve accuracy of the attitude and trajectory measurements.

Exemplary Embodiments of a Method in Accordance with the Present Invention

FIG. 1 illustrates one embodiment of a method of measuring azimuth for wellbore survey using an inertial sensor apparatus according to the disclosure herein. The method 1000 begins by moving a sensor apparatus in a wellbore, as set forth in the box 1010. The sensor apparatus may be moved, for instance, by conveying or maneuvering the sensor apparatus in the wellbore. The sensor apparatus includes two or three gyroscope units oriented orthogonally respective to each other and three accelerometer units oriented orthogonally respective to each other. Each of the two or three gyroscope units having a plurality of gyroscopes with input axes parallel to each other and each of the three accelerometer units having a plurality of accelerometers with detection axes parallel to each other. MEMS (microelectromechanical systems) type sensors may be used as the gyroscopes, and the accelerometers.

The method 1000 continues, as set forth in the boxes 1020 and 1030, by generating a single output data based on outputs from the plurality of gyroscopes included in each of the two or three gyroscope units under stationary condition and generating a single output data based on outputs from the plurality of accelerometers included in each of the three accelerometer units under stationary condition. The output data from the gyroscope units and accelerometer units may be generated by Kalman filtering as described in U.S. Pat. No. 6,882,964 which is incorporated herein by reference in its entirety.

Then, as set forth in the box 1040, the method 1000 concludes, in this particular embodiment, by determining an azimuth of a target direction relative to north direction on a horizontal plane perpendicular to a gravity direction based on the output data generated from the three accelerometer units and the output data generated from the two or three gyroscope units.

The method 1000 admits wide variation in many alternative embodiments. For instance, in some embodiments, determining the azimuth may include determining the horizontal plane perpendicular based on the output data generated from the three accelerometer units. Earth rate components may be determined based on the output data generated from the two or three gyroscope units and the earth rate vector with respect to a predetermined orthogonal sensor coordinates may be determined based on the earth rate components. Then the north direction may be determined by projecting the earth rate vector onto the horizontal plane.

In still other embodiments, determining earth rate components may include generating a first output data for each of the two or three gyroscope units with an input axis aligned to an first angular orientation under stationary condition and generating a second output data for each of the two or three gyroscope units with the input axis flipped to a second angular orientation opposite to the first angular orientation after generating the first output data under stationary condition. An earth rate component at the first angular orientation may be determined based on a difference between the first output data and the second output data to cancel out bias of the two or three gyroscope units.

Figure 2:
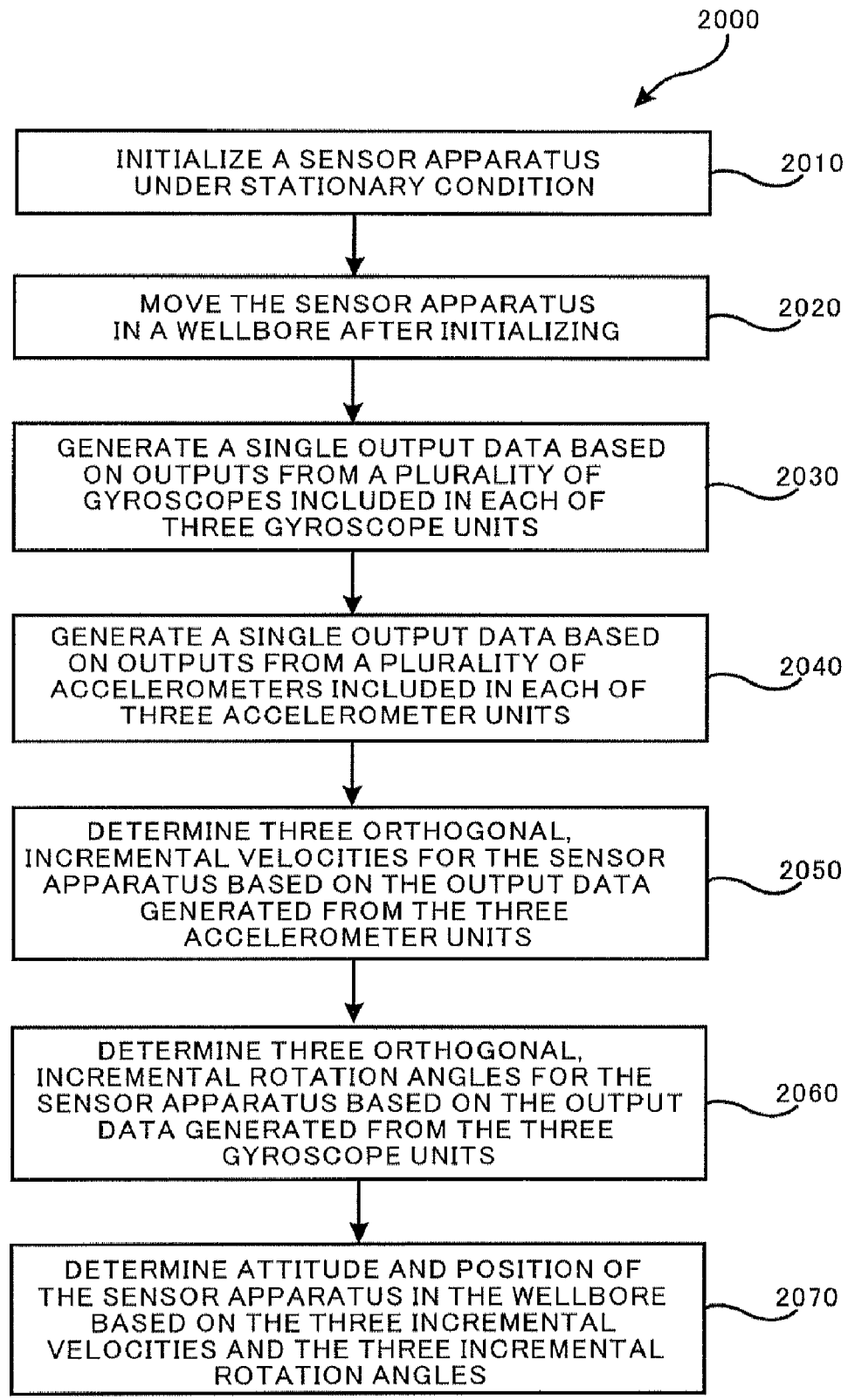
FIG. 2 is a flow chart of one exemplary method of measuring attitude of a sensor apparatus according to the disclosure herein.

FIG. 2 illustrates one embodiment of a method of measuring attitude for wellbore survey using an inertial sensor apparatus according to the disclosure herein. The method 2000 begins by initializing a sensor apparatus under stationary condition, as set forth in the box 2010. The sensor apparatus includes three gyroscope units oriented orthogonally respective to each other and three accelerometer units oriented orthogonally respective to each other, as described above. In one embodiment, this initialization may include initializing at least one of attitude and position of the sensor apparatus, for example, by at least one of alignment and initial azimuth measurement of the sensor apparatus.

The method 2000 continues, as set forth in the box 2020, by moving the sensor apparatus in a wellbore after initializing. As described above, the sensor apparatus may be moved, for instance, by conveying or maneuvering the sensor apparatus in the wellbore. Next, the method 2000 generates a single output data based on outputs from the plurality of gyroscopes included in each of the three gyroscope units, as set forth in the boxes 2030, and a single output data based on outputs from the plurality of accelerometers included in each of the three accelerometer units, as set forth in the boxes 2040.

The method 2000 then continues, as set forth in the boxes 2050 and 2060, by determining three orthogonal, incremental velocities for the sensor apparatus based on the output data generated from the three accelerometer units and determining three orthogonal, incremental rotation angles for the sensor apparatus based on the output data generated from the three accelerometer units. The output data from the gyroscope units and accelerometer units may be generated by Kalman filtering.

Then, as set forth in the box 2070, the method 2000 concludes, in this particular embodiment, by determining attitude and position of the sensor apparatus in the wellbore based on the three incremental velocities and the three incremental rotation angles.

Figure 3:
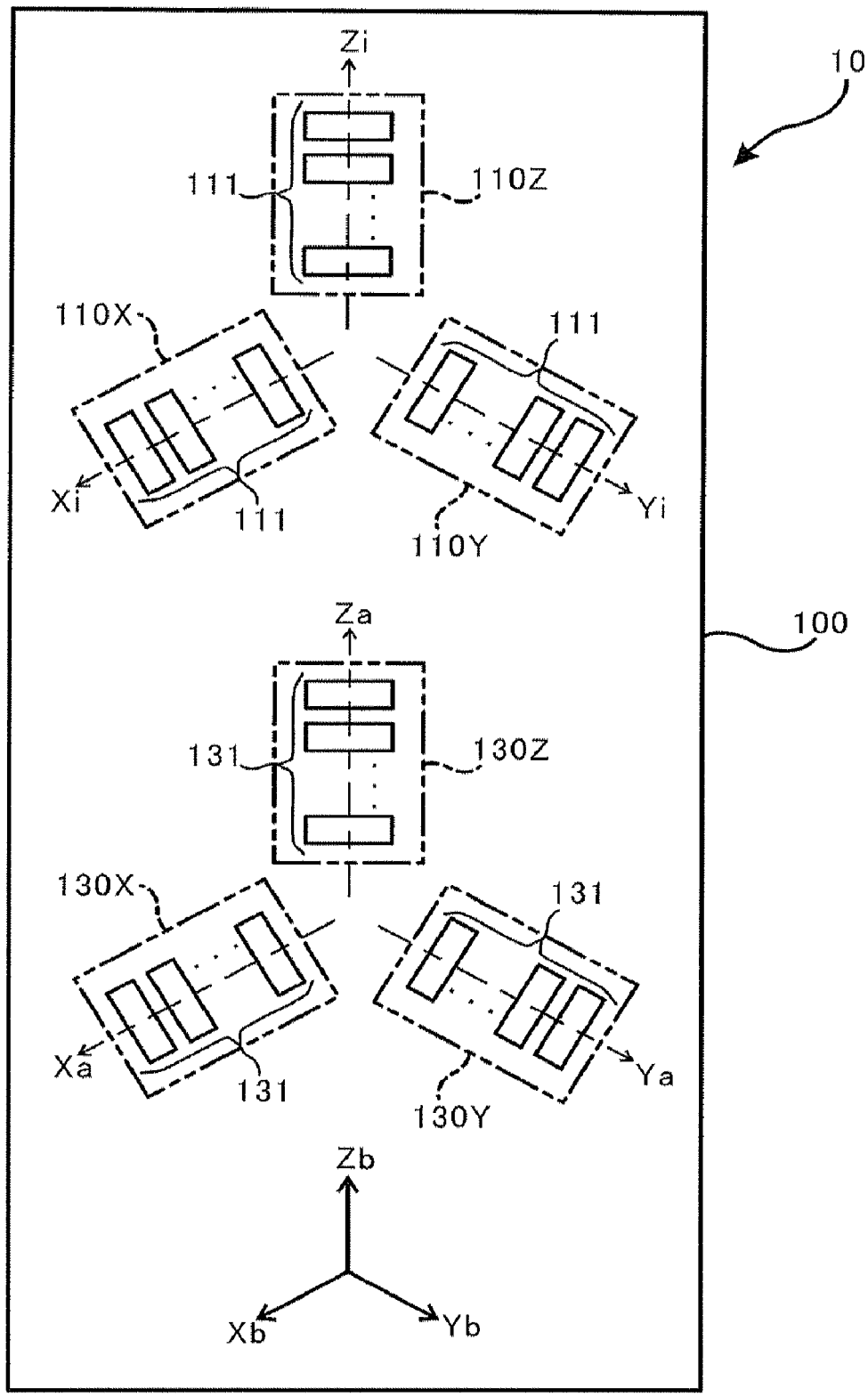
FIG. 3 is an illustration of one exemplary sensor apparatus according to the disclosure herein.

Exemplary Embodiments of a Sensor Apparatus in Accordance with the Present Invention FIG. 3 illustrates one exemplary sensor apparatus according to the disclosure herein. The sensor apparatus 10 comprises a housing 100, three gyroscope units 110X, 110Y, 110Z for measurements of rotation rates and three accelerometer units 130X, 130Y, 130Z for measurements of accelerations. The three gyroscope units 110X, 110Y, 110Z are oriented orthogonally respective to each other and mounted in orthogonal triads of the housing 100. The input axes Xi, Yi, Zi of the gyroscope units 110X, 110Y, 110Z are set to be oriented orthogonally respective to each other based on an orthogonal body coordinate system (Xb, Yb, Zb). The body coordinate system can be defined within the housing 100 such that the X-axis (Xb) is upward, the Y-axis (Yb) is left-hand, and the Z-axis (Zb) is forward. The accelerometer units 130X, 130Y, 130Z are oriented orthogonally respective to each other and mounted within the housing 100. The detection axes Xd, Yd, Zd of the accelerometer units 130X, 130Y, 130Z are set to be oriented orthogonally respective to each other based on the body coordinate system. Each of the gyroscope units 110X, 110Y, 110Z includes a plurality of gyroscopes 111 with their input axes parallel to each other. Each of the accelerometer units 130X, 130Y, 130Z includes a plurality of accelerometers 131 with their detection axes parallel to each other.

Figure 4:
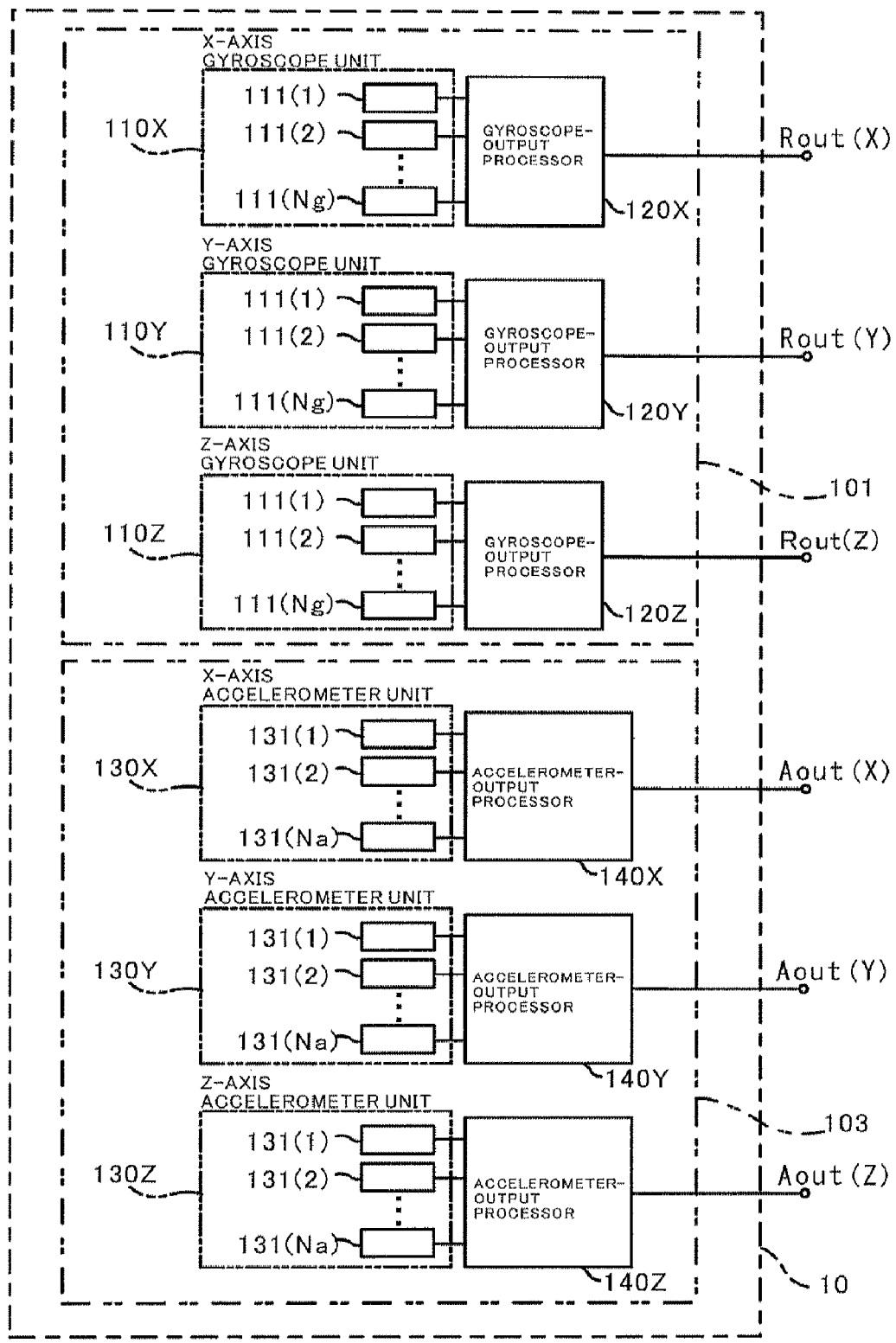
FIG. 4 is a schematic diagram of the sensor apparatus of FIG. 3 in more detail.

FIG. 4 is a schematic diagram of the sensor apparatus of FIG. 3 in more detail. The sensor apparatus 10 comprises a gyroscope section 101 and an accelerometer section 103. The gyroscope section 101 includes the three gyroscope units 110X, 110Y, 110Z for measurements of rotation rates and three gyroscope-output processors 120X, 120Y, 120Z corresponding to the gyroscope units 110X, 110Y, 110Z, respectively. Each of the gyroscope units 110X, 110Y, 110Z includes a plurality of gyroscopes 111(1), 111(2), ..., 111(Ng) with input axes parallel to each other, where Ng represents the number of the gyroscopes 111. Each of the gyroscope-output processors 120X, 120Y, 120Z generates a single output data Rout of rotation rate around a corresponding input axis, based on the outputs from the plurality of gyroscopes 111(1), 111(2), ..., 111(Ng).

The accelerometer section 103 includes the three accelerometer units 130X, 130Y, 130Z for measurements of accelerations and three accelerometer-output processors 140X, 140Y, 140Z corresponding to the accelerometer units 130X, 130Y, 130Z, respectively. Each of the accelerometer units 130X, 130Y, 130Z includes a plurality of accelerometers 131(1), 131(2), ..., 131(Na) with detection axes parallel to each other, where Na represents the number of the accelerometers, respectively. Each of the accelerometer-output processors 140X, 140Y, 140Z generates a single output data Aout of acceleration along the corresponding detection axis, based on the outputs from the plurality of accelerometers 131(1), 131(2), ..., 131(Na).

The sensor apparatus 10 admits wide variation in many alternative embodiments. For instance, in some embodiments, the three gyroscope units 110X, 110Y, 110Z may be configured as a unitary module and the three accelerometer units 130X, 130Y, 130Z may be also configured as a unitary module. In other embodiments, the unitary module of the gyroscope units 110X, 110Y, 110Z may further include the three gyroscope-output processors 120X, 120Y, 120Z, and the unitary module of the accelerometer units 130X, 130Y, 130Z may further include the three accelerometer-output processors 140X, 140Y, 140Z. Each of the unitary modules may be formed of a single semiconductor substrate including sensor elements and peripheral circuits for driving the sensor elements and processing output signals from the sensor elements.

In other alternative embodiments, each of the gyroscope units 110X, 110Y, 110Z may include ten or more gyroscopes 111 (i.e. Ng≧10) so that the outputs from the gyroscopes 111 take on a normal or quasi-normal distribution. Each of the accelerometer units 130X, 130Y, 130Z may also include ten or more accelerometers 131 (i.e. Na≧10) so that the outputs from the accelerometers 131 take on a normal or quasi-normal distribution.

In still other embodiments, each of the gyroscope units 110X, 110Y, 110Z may include two kinds of gyroscopes 111 having mutually different sensitivities or different dynamic ranges. Each of the accelerometer units 130X, 130Y, 130Z may also include two kinds of accelerometers 131 having mutually different sensitivities or different dynamic ranges. In some embodiments, the sensor apparatus 10 may further include a three-axis gravity sensor for sensing gravity direction with respect to mutually orthogonal three axes. Each of the gyroscopes 111 and accelerometers 131 may be a MEMS (Micro Electro Mechanical Systems) sensor.

In some examples of the embodiments, each of the gyroscope-output processors 120X, 120Y, 120Z may generate the single output data Rout(x), Rout(y), Rout(z) by averaging the outputs from the gyroscopes 111(1), 111(2), ..., 111(Ng). In other examples, each of the gyroscope-output processors 120X, 120Y, 120Z may generate estimates of the output data Rout(x), Rout(y), Rout(z) based on the outputs from the gyroscopes 111(1), 111(2), ..., 111(Ng) by utilizing a Kalman filter. These gyroscope-output processors 120X, 120Y, 120Z can generate the output data Rout(x), Rout(y), Rout(z) by significantly reducing a part of the bias drift noise which could behave consistently to all gyroscopes 111(1), 111(2), ..., 111(Ng) for instance due to environmental temperature drift, or power supply fluctuation. Especially if there are favorable correlations between the sensors, large bias reduction is expected.

Figure 5:
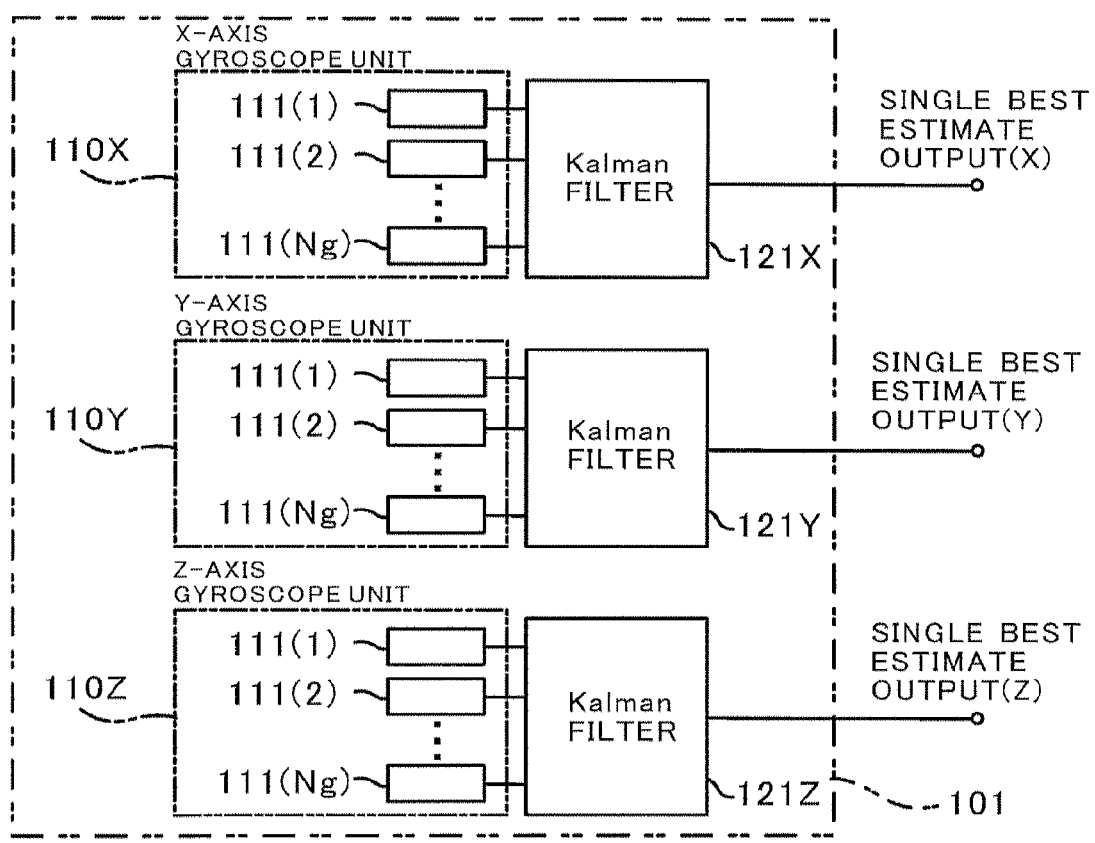
FIG. 5 is a schematic diagram of one exemplary data processing for generation of gyroscope output estimates of the sensor apparatus according to the disclosure herein.

FIG. 5 shows a schematic diagram of one exemplary data processing for generation of gyroscope output estimates. The outputs from the gyroscopes 111(1), 111(2), ..., 111(Ng) in each of the gyroscope units 110X, 110Y, 110Z are input to the corresponding Kalman filter 121X, 121Y or 121Z. Each of the Kalman filters 121X, 121Y, 121Z can generate a single best estimate as an output data Rout(x), Rout(y), Rout(z), as described in U.S. Pat. No. 6,882,964 which is incorporated herein by reference in its entirety. This Kalman filtering, for instance, is used to combine the gyroscopes optimally in the sense of minimizing the variance of the rotation rate error by using a steady state Kalman filter. The Kalman filter can derive a higher accuracy output representing a best estimate of a virtual sensed rotation rate even where the gyroscopes have a drift component.

In some examples of the aforementioned embodiment, each of the accelerometer-output processors 140X, 140Y, 140Z may generate the single output data Aout(x), Aout(y), Aout(z) by averaging the outputs from the accelerometers 131(1), 131(2), ..., 131(Na). In yet another example, each of the accelerometer-output processors 140X, 140Y, 140Z may be configured to generate estimates of the output data Aout (x), Aout(y), Aout(z) based on the outputs from the accelerometers 131(1), 131(2), ..., 131(Na) by utilizing a Kalman filter, for instance, in the same manner as above-described for the output data Rout of rotation rate measurements.

Figure 6:
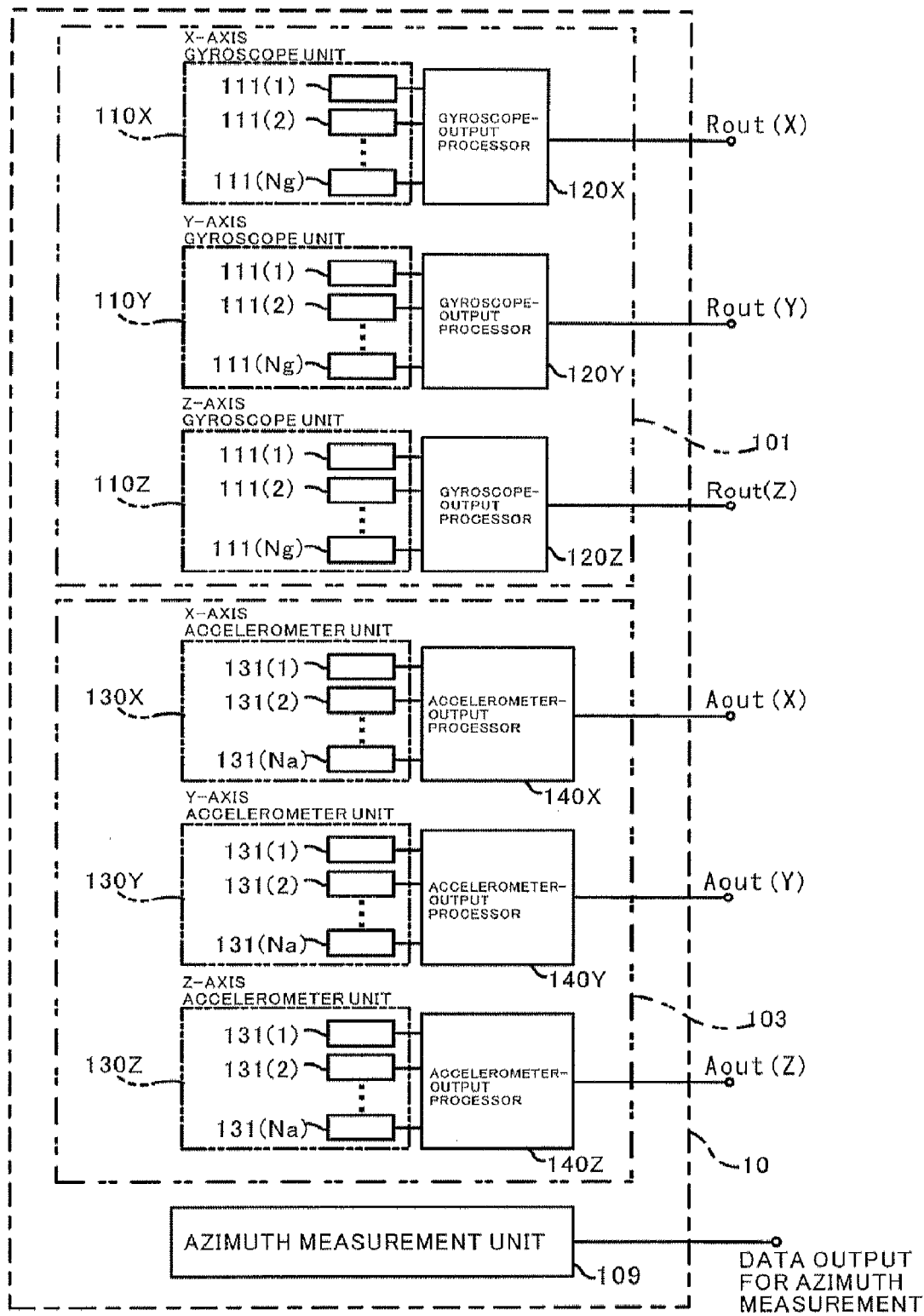
FIG. 6 is a schematic diagram of another exemplary sensor apparatus according to the disclosure herein.
Figure 7:
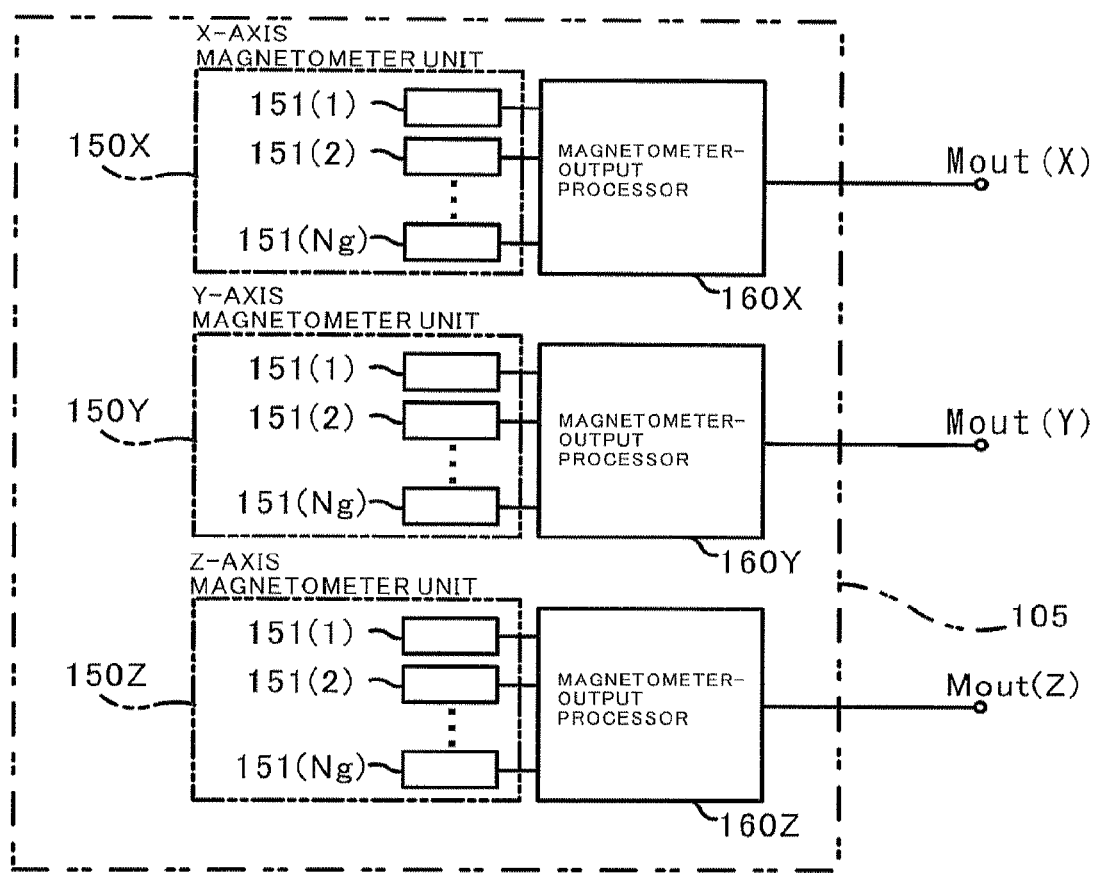
FIG. 7 is a schematic diagram of one exemplary azimuth measurement unit according to the disclosure herein.
Figure 8:
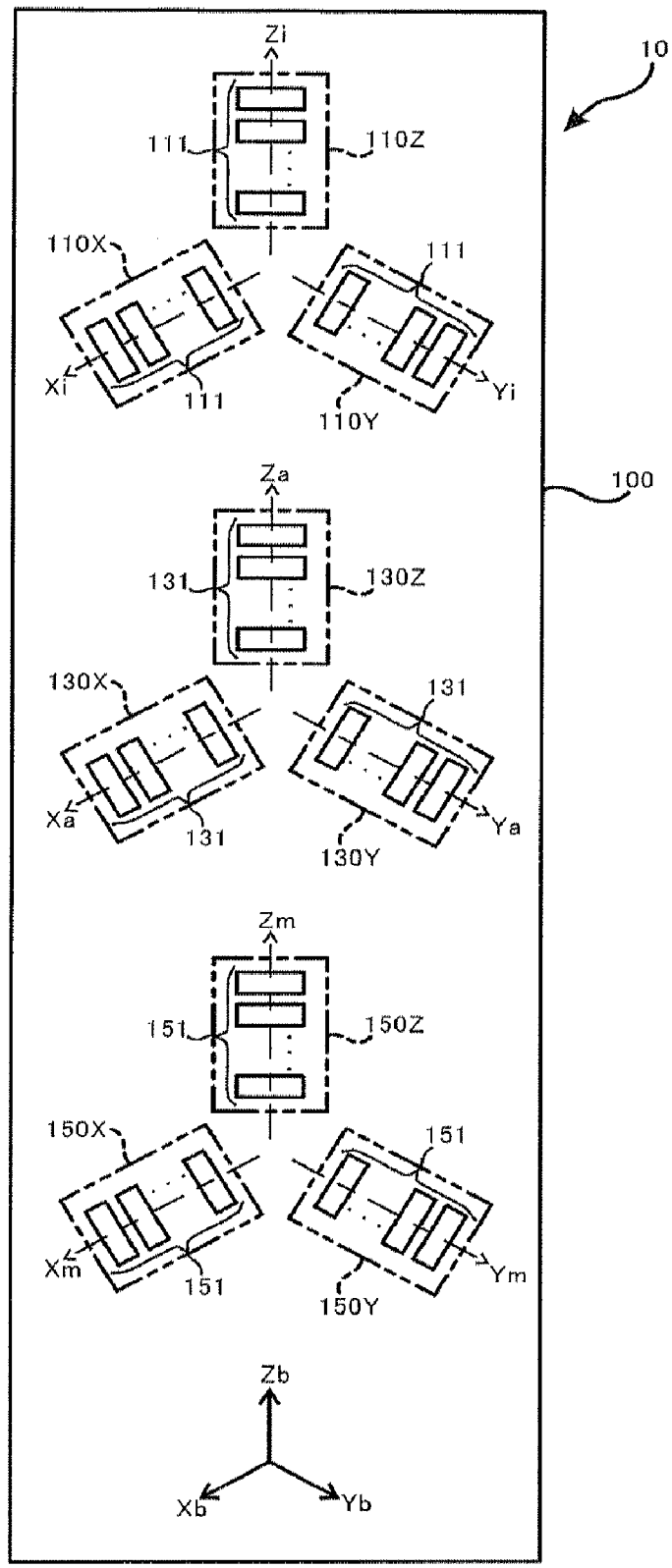
FIG. 8 is an illustration of one exemplary sensor apparatus shown in FIG. 7.

FIG. 6 shows a sensor apparatus according to another embodiment of the present invention. The sensor apparatus 10 in this embodiment further includes an azimuth measurement unit 109 for azimuth measurements. The gyroscope section 101 and accelerometer section 103 may be configured as same as shown in FIG. 3. The azimuth measurement unit 109 may be configured to be a magnetometer section 105 as shown in FIGS. 7 and 8. The magnetometer section 105 includes three magnetometer units 150X, 150Y, 150Z for measurements of earth magnetic field with respect to mutually orthogonal three axes X, Y, Z of the body coordinate system, and three magnetometer-output processors 160X, 160Y, 160Z corresponding to the magnetometer units 150X, 150Y, 150Z, respectively. The three magnetometer units 150X, 150Y, 150Z are oriented orthogonally respective to each other. The detection axes Xm, Ym, Zm of the magnetometer units 150X, 150Y, 150Z are set to be oriented orthogonally respective to each other based on the body coordinate system. Each of the magnetometer units 150X, 150Y, 150Z includes a plurality of magnetometers 151(1), 151(2), ..., 151(Nm) with detection axes parallel to each other, where Nm represents the number of the magnetometers 151. Each of the magnetometer-output processors 160X, 160Y, 160Z generates a single output data Mout of earth magnetic field along a corresponding detection axis, based on the outputs from the plurality of magnetometers 151(1), 151(2), ..., 151(Nm).

The three magnetometer units 150X, 150Y, 150Z may be configured as a unitary module. In other embodiments, the unitary module of the magnetometer units 150X, 150Y, 150Z may further include the three magnetometer-output processors 160X, 160Y, 160Z. Each of the unitary modules may be formed of a single semiconductor substrate including sensor elements and peripheral circuits for driving the sensor elements and processing output signals from the sensor elements.

In the embodiment of magnetometer section 105 shown in FIGS. 7 and 8, each of the magnetometer units 150X, 150Y, 150Z may include ten or more magnetometers 151 (i.e. Nm≧10) so that the outputs from the magnetometers 151 take on a normal or quasi-normal distribution. In some examples of the embodiment, each of the magnetometers 151 may be a MEMS sensor.

In some examples of the embodiment shown in FIGS. 7 and 8, each of the magnetometer units 150X, 150Y, 150Z may generate the single output data Mout by averaging the outputs from the magnetometers 151(1), 151(2), ..., 151(Nm). In other examples, each of the magnetometer units 150X, 150Y, 150Z may generate a single best estimate as each of the output data Mout based on the outputs from magnetometers 151(1), 151(2), ..., 151 (Nm) by utilizing a Kalman filter, for instance, in the same manner as above-described for the output data Rout of rotation rate measurements.

Figure 9:
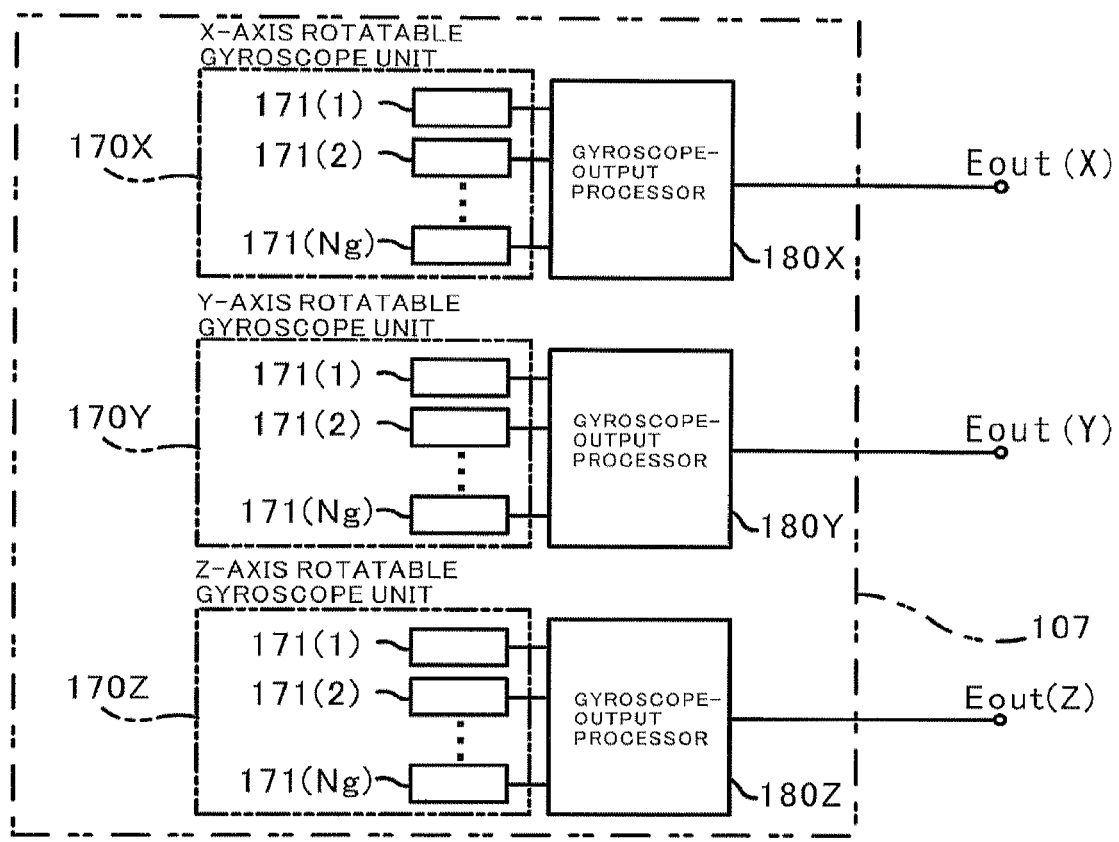
FIG. 9 is a schematic diagram of another exemplary azimuth measurement unit according to the disclosure herein.
Figure 10:
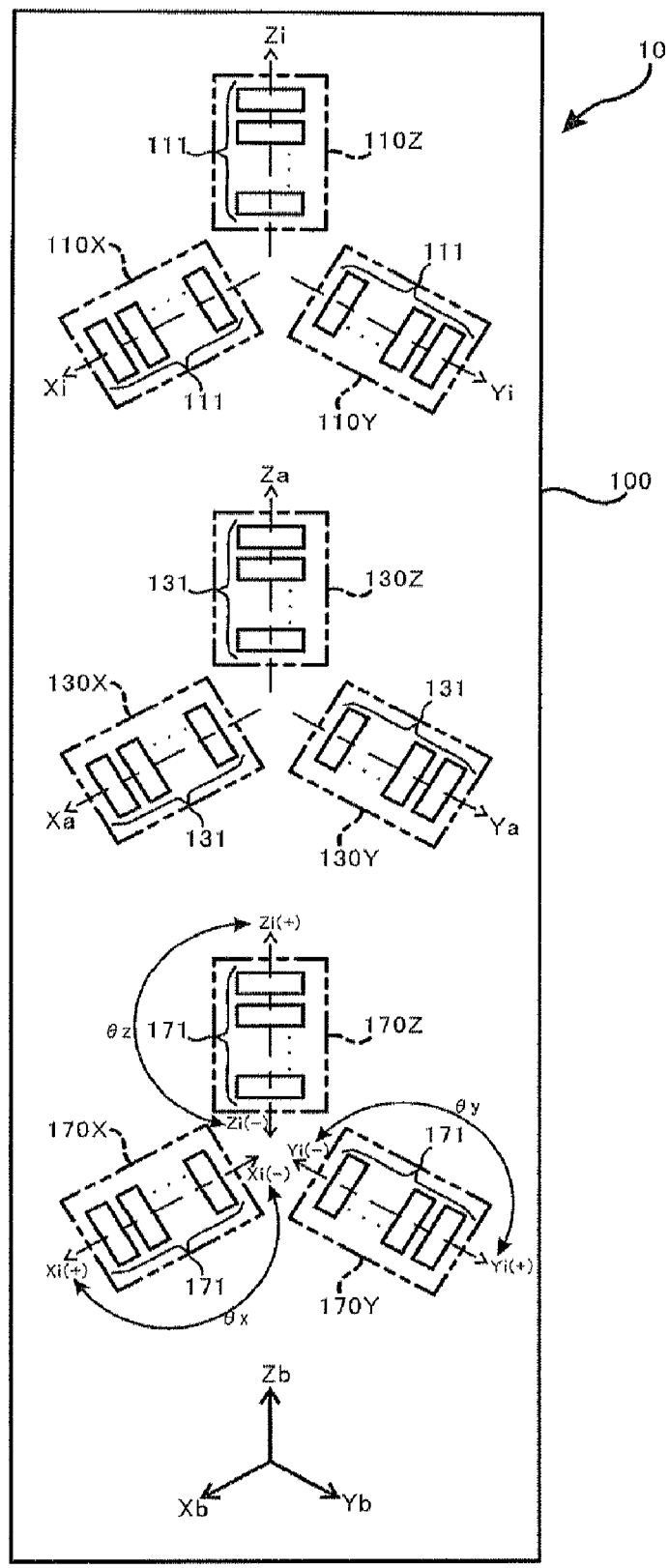
FIG. 10 is an illustration of one exemplary sensor apparatus shown in FIG. 9.

The azimuth measurement unit 109 in FIG. 6 may be configured to be a gyroscope section 107 for azimuth measurements as shown FIGS. 9 and 10. The gyroscope section 107 for azimuth measurements includes three rotatable gyroscope units 170X, 170Y, 170Z for measurements of the earth rate, and three gyroscope-output processors 180X, 180Y, 180Z corresponding to the rotatable gyroscope units 170X, 170Y, 170Z, respectively. Each of the rotatable gyroscope units 170X, 170Y, 170Z includes a plurality of rotatable gyroscopes 171(1), 171(2), ..., 171(Nrg) with input axes parallel to each other, where Nrg represents the number of the rotatable gyroscopes 171. Each of the rotatable gyroscope units 170X, 170Y, 170Z is coupled to a driver unit so that each of the gyroscope units can be driven independently to rotate the input axes of the rotatable gyroscopes included in the corresponding gyroscope unit around one of mutually orthogonal three axes of X, Y, Z, respectively. For example, all of the rotatable gyroscopes included in the rotatable gyroscope units 170X are rotated around Y-axis or Z-axis by θx so as to flip the input axis from a first angular orientation of Xi(+) in +X direction to a second angular orientation of Xi(−) in −X direction opposite to the first angular orientation as shown in FIG. 10. The gyroscope units 170X, 170Y, 170Z may be rotated by a driving mechanism using at least one motor and transmission gears, as described in pending U.S. patent application Ser. No. 12/240,943 filed on Sep. 29, 2008. The U.S. patent application of Ser. No. 12/240,943 is incorporated herein by reference in its entirety. Each of the gyroscope-output processors 180X, 180Y, 180Z generates a single output data Eout of earth rate component around a corresponding input axis, based on the outputs from the plurality of rotatable gyroscopes 171(1), 171(2), ..., 171(Nrg).

The three rotatable gyroscope units 170X, 170Y, 170Z may be configured as a rotatable unitary module. In other embodiments, the unitary module of the rotatable gyroscope units 170X, 170Y, 170Z may further include the three gyroscope-output processors 180X, 180Y, 180Z. Each of the unitary modules may be formed of a single semiconductor substrate including sensor elements and peripheral circuits for driving the sensor elements and processing output signals from the sensor elements.

In the embodiment of gyroscope section 107 for azimuth measurements shown in FIG. 8, each of the rotatable gyroscope units 170X, 170Y, 170Z may include ten or more gyroscopes 171 (i.e. Nrg≧10) so that the outputs from the rotatable gyroscopes 171 take on a normal or quasi-normal distribution. In some examples of the embodiment, each of the rotatable gyroscopes 171 may be a MEMS sensor.

In some examples of the embodiment shown in FIGS. 9 and 10, each of the gyroscope-output processors 180X, 180Y, 180Z may generate the single output data Eout(x), Eout(y), Eout(z) of earth rate components by averaging the outputs from the rotatable gyroscopes 171(1), 171(2), ..., 171(Nrg). In other examples, each of the gyroscope-output processors 180X, 180Y, 180Z may generate a single best estimate as an output data Eout(x), Eout(y), Eout(z) based on the outputs from the rotatable gyroscopes 171(1), 171(2), ..., 171(Nrg) by utilizing a Kalman filter, for instance, in the same manner as above-described for the output data Rout of rotation rate measurements. These gyroscope-output processors 180X, 180Y, 180Z can generate the output data Eout(x), Eout(y), Eout(z) by canceling a part of the bias drift noise which could behave consistently to all gyroscopes 171(1), 171(2), ..., 171(Nrg) due to environmental temperature drift or power supply fluctuation. The data processing for azimuth measurements by using the output data Eout(x), Eout(y), Eout(z) may be performed as described in U.S. Provisional Patent Application No. 61/053,646 filed on May 15, 2008 and co-pending and commonly owned U.S. patent application Ser. No. 12/233,592 filed on 19 Sep. 2008. These U.S. patent applications of No. 61/053,646 and Ser. No. 12/233,592 are incorporated herein by reference in its entirety.

The gyroscope section 107 for azimuth measurements may be configured to have one or two of the rotatable gyroscope units 170X, 170Y, 170Z in the case that the earth rate around one or two of X, Y, Z axes is small enough to be negligible for determination of the earth rate vector.

In other embodiments, non-rotatable gyroscope units may be used for the azimuth measurement unit 109 in FIG. 6, instead of the aforementioned rotatable gyroscope units 170X, 170Y, 170Z. The non-rotatable gyroscope units are oriented orthogonally respective to each other and rigidly mounted within the housing. Each of the non-rotatable gyroscope units includes a plurality of gyroscopes. In some examples, a single output data for each of the non-rotatable gyroscope units may be generated based on outputs from the plurality of gyroscopes included in each of the non-rotatable gyroscope units. In other examples, a single best estimate for each of the non-rotatable gyroscope units based on the outputs from the gyroscopes by utilizing a Kalman filter, for instance, in the same manner as above-described for the output data Rout of rotation rate measurements.

In yet other embodiments, the three gyroscope units 110X, 110Y, 110Z of the sensor apparatus 10 shown in FIGS. 3 and 4 may be configured by using rotatable gyroscopes units instead of non-rotatable gyroscopes. In this embodiments, the rotatable gyroscopes units may be used for measurements of rotation rates of the sensor apparatus 10 as well as azimuth measurements.

Figure 11:
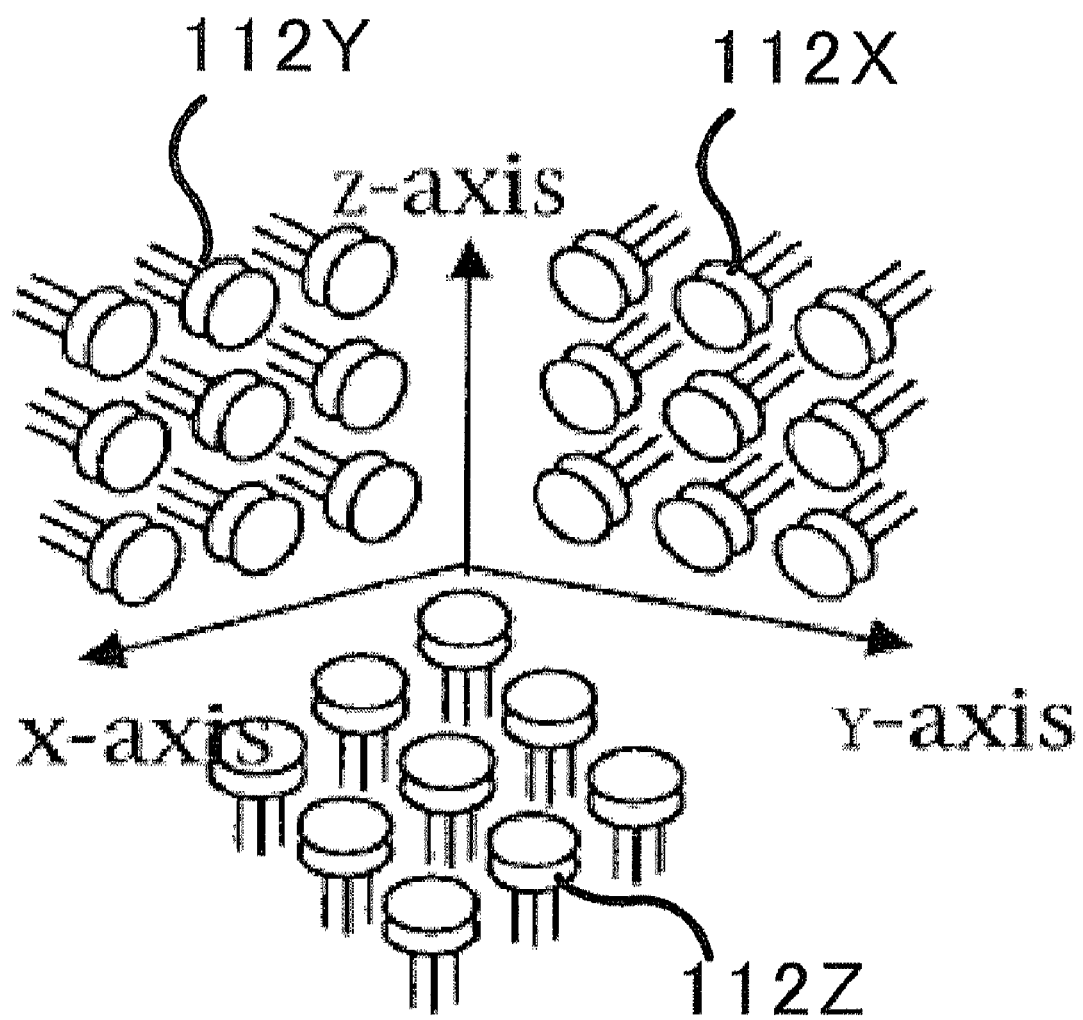
FIG. 11 is a perspective illustration of one exemplary configuration of gyroscope units according to the disclosure herein.

FIG. 11 shows an exemplary configuration of the gyroscope units 110X, 110Y, 110Z of the sensor apparatus 10 in the above-mentioned embodiments. In this configuration, each of the gyroscope units 110X, 11-Y, 110Z is configured to be a sensor array of a plurality of discrete gyroscopes 112X, 112Y, 112Z such as MEMS sensors. The discrete gyroscopes in each of the gyroscope units 110X, 110Y, 110Z are mounted on a common substrate at almost even intervals so as to align the input axes thereof parallel to each other along the corresponding coordinate axis of X-, Y- or Z-axis.

Figure 12:
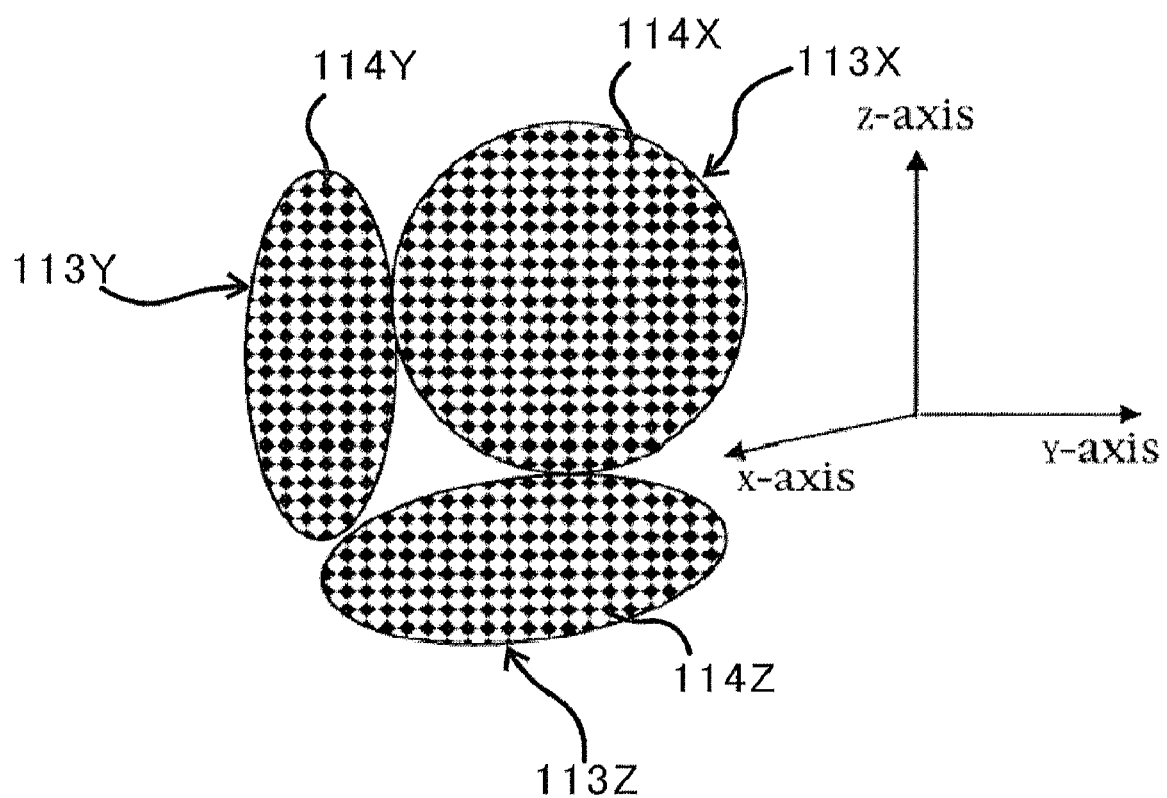
FIG. 12 is a perspective illustration of another exemplary configuration of gyroscope units according to the disclosure herein.

FIG. 12 shows another exemplary configuration of the gyroscope units 110X, 110Y, 110Z of the sensor apparatus 10. In this configuration, the gyroscope units 110X, 110Y, 110Z is fabricated on semiconductor wafers 113X, 113Y, 113Z, respectively. Each dot on the wafers 113X, 113Y, 113Z represents a gyroscope element 114X, 114Y, 114Z fabricated on the wafer by semiconductor technology. The gyroscope elements in each of the gyroscope units 110X, 110Y, 110Z are aligned so that the input axes of the gyroscope elements are parallel to each other along the corresponding coordinate axis of X-, Y- or Z-axis.

Figure 13:
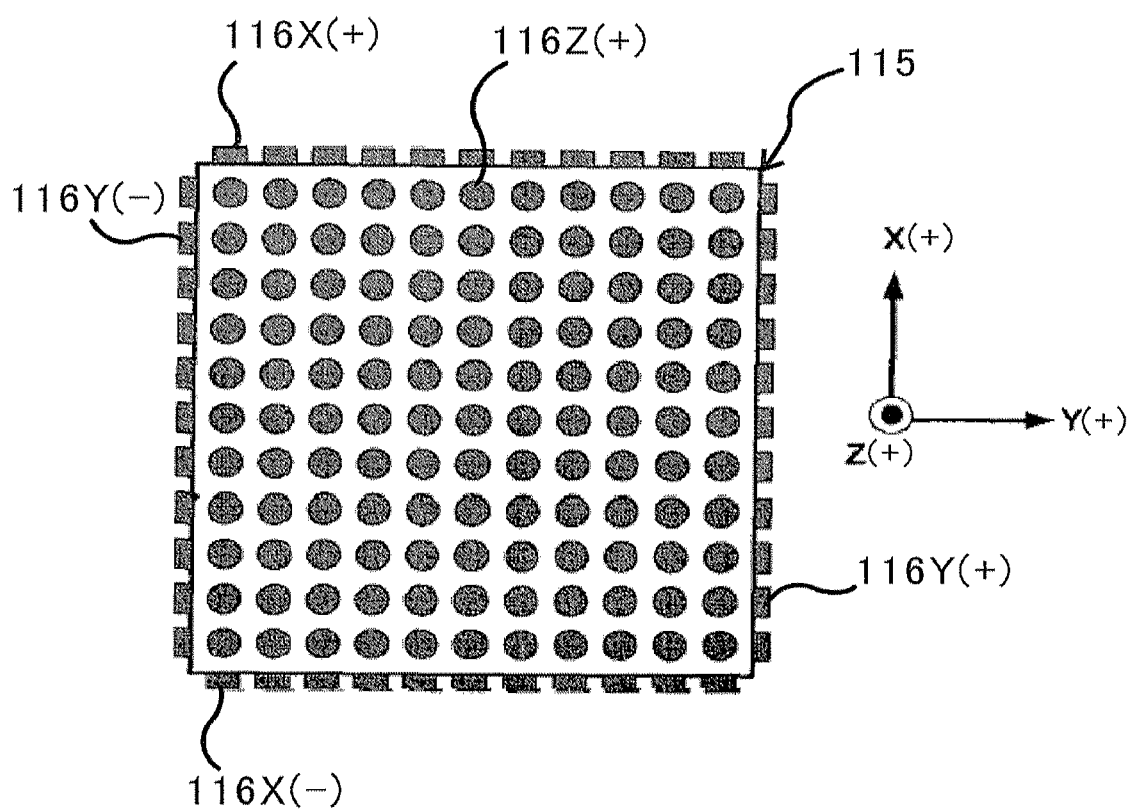
FIG. 13 is a perspective illustration of yet another exemplary configuration of gyroscope units according to the disclosure herein.

FIG. 13 shows yet another exemplary configuration of the gyroscope units of the sensor apparatus 10. In this configuration, six gyroscope units are arranged on six faces of a cubic body 115, respectively. The discrete gyroscopes 116X, 116Y, 116Z such as MEMS sensors of each gyroscope unit are aligned so that the input axes of the gyroscopes are parallel to each other along the corresponding coordinate axis of X(+), X(-), Y(+), Y(-), Z(+) or Z(-) axis.

The configurations for sensor units of gyroscopes 111 shown FIGS. 11, 12 and 13 may be also adopted for the accelerometers 131, the magnetometers 151 and the rotatable gyroscopes 171 in above-mentioned embodiments.

Figure 14:
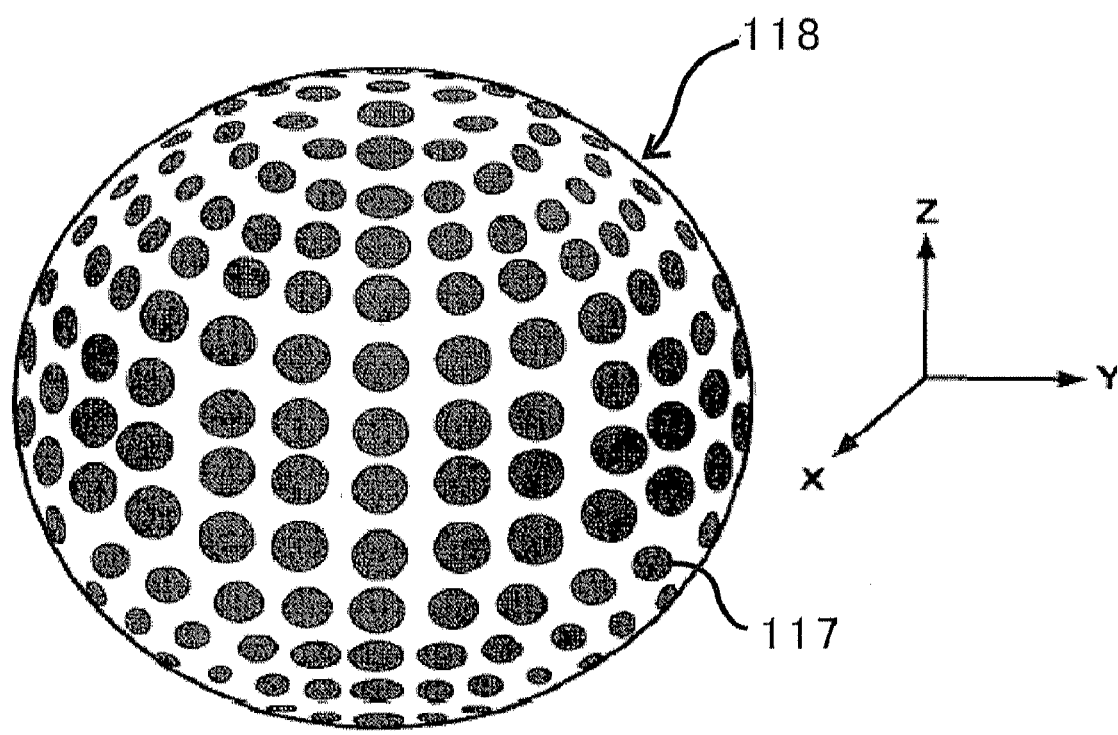
FIG. 14 is a perspective illustration of yet another exemplary configuration of gyroscope units according to the disclosure herein.

FIG. 14 shows one exemplary configuration of the gyroscopes suitable for the azimuth measurement unit 109 of the sensor apparatus 10. In this configuration, a number of gyroscopes 117 are arranged on a surface of a spherical body 118 so that the gyroscopes 117 have input axes aligned to mutually different directions. Without driving for rotation of the spherical body 118, the outputs from the gyroscopes 117 are available for the rotation rate data with respect to the various input axes. The rotation rate data may be fitted in a sinusoidal curve to improve the accuracy of the azimuth determination. The gyroscopes used for the azimuth measurements may be selected from the gyroscopes 117 on the spherical body 118 so that the selected gyroscopes can detect the earth rotation effectively depending on attitude of the azimuth measurement unit 109 against the earth rotation. The data processing for azimuth measurements by using the output from the gyroscopes 117 may be performed as described in U.S. Provisional Patent Application No. 61/053,646 and co-pending and commonly owned U.S. patent application Ser. No. 12/233, 592.

Exemplary Embodiments of a System in Accordance with the Present Invention

Figure 15:
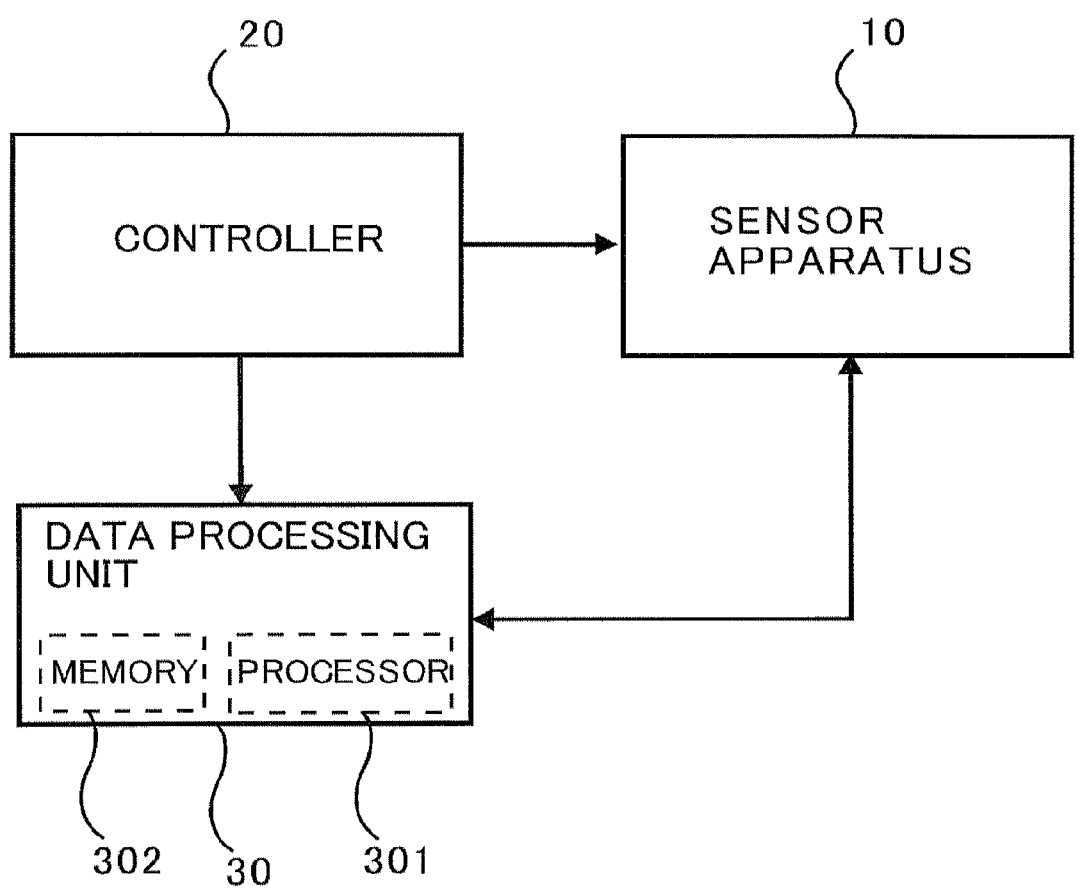
FIG. 15 is a is schematic diagram of one exemplary system according to the disclosure herein.

FIG. 15 shows a system for wellbore survey according to one embodiment of the present invention. The system in FIG. 15 may be used for azimuth measurements as described in FIG. 1 in various wellbore survey operations such as LWD, MWD and WL logging. This system may be also used for determining attitude and/or position of a wellbore tool such as a wireline logging tool and a drilling tool for navigation in various well bore operations as described in FIG. 2. Referring to FIG. 15, the system includes a sensor apparatus 10 provided in a wellbore tool, a controller 20 for controlling the sensor apparatus 10 and a data processing unit 30 for processing output data from the sensor apparatus 10. The sensor apparatus of the system may be any one of the sensor apparatus 10 disclosed in the embodiments referring to FIGS. 3-14. The data processing unit 30 includes a computer having a processor 301 and a memory 302. The memory 302 stores a program having instructions for the determination position and attitude of the tool and the azimuth measurements. The output data from the sensor apparatus 10 and the data of position and attitude of the tool after processing are also stored in the memory 302. The data processing unit 30 may determine attitude and position of the tool based on the output data from the gyroscopes and the accelerometers in the sensor apparatus 10. The data processing unit 30 may determine gravity direction at each position of the tool based on the outputs from the accelerometers and correct the attitude based on the gravity direction. In the case that the sensor apparatus 10 includes a three-axis gravity sensor for sensing gravity direction with respect to mutually orthogonal three axes, the data processing unit 30 may determine the gravity direction based on the outputs from the gravity sensor and corrects the attitude based on the gravity direction.

In the embodiment where the sensor apparatus 10 includes an azimuth measurement unit 109 for measurements of azimuth with respect to mutually orthogonal three axes as shown in FIG. 6, the data processing unit 30 may determine attitude of the tool based on the outputs from the of gyroscopes, the output from the accelerometers and the azimuth measured by the azimuth measurement unit 109. In the case that the sensor apparatus 10 includes the magnetometers as shown in FIGS. 7 and 8, the rotatable gyroscope for azimuth measurements as shown in FIGS. 9 and 10 and a driver unit for rotating the rotatable gyroscopes controlled by the controller 20, the data processing unit 30 may determine attitude of the tool based on the outputs from the gyroscopes, the accelerometers and the magnetometers while moving the tool, when the outputs from the magnetometers is available. On the other hand, when the outputs from the magnetometers is not available, the data processing unit 30 may determine the attitude based on the outputs from the gyroscopes of the gyroscope units for measurements of rotation rates, the accelerometers and the gyroscopes of the rotatable gyroscope unit for azimuth measurements under a stationary condition of the tool.

In other embodiments, the system may include a cable measurement unit for measuring length of a cable connected to the tool located under ground, and the data processing unit 30 may determine trajectory of the moving tool under the ground based on the outputs from the gyroscopes, the output from the accelerometers, the azimuth measured by the azimuth measurement unit and the cable length measured by the cable-length measurement unit.

Figure 16:
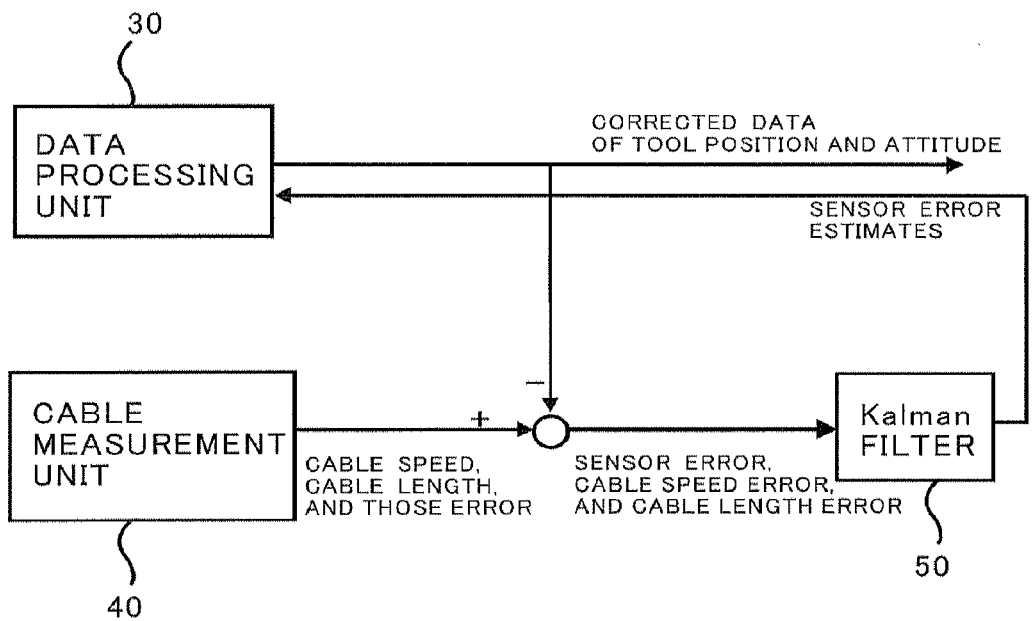
FIG. 16 is a is schematic diagram of one exemplary data processing for determination of trajectory of the tool according to the disclosure herein.

FIG. 16 shows a schematic diagram of one exemplary data processing for determination of trajectory of a wireline logging tool with the sensor apparatus 10 conveyed or maneuvered in wellbore under the ground by using a Kalman filter. The cable measurement unit 40 outputs data of length of the tool as data of total traveling distance of the tool from the ground for determining the trajectory. The cable measurement unit 40 may output data of moving speed of the cable so as to improve accuracy of the trajectory measurements. The data of cable length output from the cable measurement unit 40 include some error due to yawing of the cable and so on. To reduce the error, acceleration information obtained from the sensor apparatus 10 is used in a Kalman filter 50. The output data from the cable measurement unit 40 and the output data of rotation rate and acceleration from the sensor apparatus 10 are added and input to the Kalman filter 50. The Kalman filter may estimates error of the tool position and attitude by using true acceleration data and feedback the error to the data processing unit 30. The true acceleration data due to moving of the tool are obtained by estimating gravity acceleration components with respect to the sensor coordinate system (body coordinate system) and subtracting the estimated gravity acceleration components from the acceleration data output from the sensor apparatus 10. The corrected data of the tool position and attitude may be output from the data processing unit 30 and used for determination of trajectory of the tool.

The sensor apparatus and system disclosed herein may be used for measurements of attitude and trajectory of a drilling tool as well as a wireline logging tool on oil filed operations. In the case of trajectory measurements of the drilling tool, the total length of drilling pipes from the ground may be used for determining the trajectory of the drilling tool.

The preceding description has been presented only to illustrate and describe certain embodiments. It is not intended to be exhaustive or to limit the invention to any precise form disclosed. Many modifications and variations are possible in light of the above teaching.

The embodiments and aspects were chosen and described in order to best explain principles of the invention and its practical applications. The preceding description is intended to enable others skilled in the art to best utilize the principles in various embodiments and aspects and with various modifications as are suited to the particular use contemplated. It is intended that the scope of the invention be defined by the following claims.

What is claimed is:

1. A method of measuring attitude for wellbore survey comprising:
    initializing a sensor apparatus under stationary condition, the sensor apparatus including three gyroscope units oriented orthogonally respective to each other and three accelerometer units oriented orthogonally respective to each other under stationary condition in a wellbore, each of the gyroscope units having a plurality of gyroscopes with input axes parallel to each other and each of the accelerometer units having a plurality of accelerometers with detection axes parallel to each other;
    moving the sensor apparatus in a wellbore after initializing;
    generating a single output data based on outputs from the plurality of gyroscopes included in each of the three gyroscope units;
    generating a single output data based on outputs from the plurality of accelerometers included in each of the three accelerometer units;
    determining three orthogonal, incremental velocities for the sensor apparatus based on the output data generated from the three accelerometer units;
    determining three orthogonal, incremental rotation angles for the sensor apparatus based on the output data generated from the three gyroscope units; and
    determining attitude and position of the sensor apparatus in the wellbore based on the three incremental velocities and the three incremental rotation angles.

2. The method according to claim 1, wherein the three gyroscope units are configured as a unitary module, and the three accelerometer units are configured as a unitary module.

3. The method according to claim 2, wherein the unitary module is formed of a single semiconductor substrate.

4. The method according to claim 1, wherein the gyroscope units comprise:
    a first gyroscope unit having a plurality of gyroscopes with input axes parallel to a first axis of mutually orthogonal three axes; and
    a second sensor unit having a plurality of gyroscopes with input axes parallel to a second axis of the orthogonal three axes.

5. The method according to claim 1, wherein the gyroscope units comprise:
    a first gyroscope unit having a plurality of gyroscopes with input axes parallel to a first axis of mutually orthogonal three axes;
    a second sensor unit having a plurality of gyroscopes with input axes parallel to a second axis of the orthogonal three axes; and
    a third sensor unit having a plurality of gyroscopes with input axes parallel to a third axis of the orthogonal three axes.

6. The method according to claim 1, wherein each of the gyroscope units comprises ten or more gyroscopes so that the outputs from the ten or more gyroscopes take on a normal or quasi-normal distribution.

7. The method according to claim 1, wherein each of the gyroscope units comprises two or more kinds of gyroscopes having mutually different sensitivities or different dynamic ranges.

8. The method according to claim 1, wherein each of the accelerometer units comprises ten or more accelerometers so that the outputs from the ten or more accelerometers take on a normal or quasi-normal distribution.

9. The method according to claim 1, wherein each of the accelerometer units comprises two or more kinds of accelerometers having mutually different sensitivities or different dynamic ranges.

10. The method according to claim 9, wherein one of the two or more kinds of accelerometers is used for measurements of gravity.

11. The method according to claim 1, wherein each of the gyroscopes in the three gyroscope units and the accelerometers in the three accelerometer units is a MEMS sensor.

12. The method according to claim 1, further comprising averaging the outputs from the plurality of gyroscopes.

13. The method according to claim 1, further comprising generating an estimate of the single output data based on the outputs from the plurality of gyroscopes.

14. The method according to claim 13, wherein at least one Kalman filter is used for generating the estimate.

15. The method according to claim 1, further comprising averaging the outputs from the plurality of accelerometers.

16. The method according to claim 1, further comprising generating an estimate of the single output data based on the outputs from the plurality of accelerometers.

17. The method according to claim 16, wherein at least one Kalman filter is used for generating the estimate.

18. The method according to claim 1, wherein the sensor apparatus further comprises a three-axis gravity sensor, the gravity sensor sensing gravity direction with respect to mutually orthogonal three axes.

19. The method according to claim 1, wherein the sensor apparatus further comprises an azimuth measurement unit for measurements of azimuth with respect to mutually orthogonal three axes.

20. The method according to claim 19, wherein the azimuth measurement unit comprises three magnetometer units oriented orthogonally respective to each other and mounted within the housing, each of the magnetometer units having a plurality of magnetometers with detection axes parallel to each other.

21. The method according to claim 20, further comprising: generating a single output data based on outputs from the plurality of magnetometers included in each of the three magnetometer units.

22. The method according to claim 21, further comprising averaging the outputs from the plurality of magnetometers.

23. The method according to claim 21, further comprising generating an estimate of the single output data based on the outputs from the plurality of magnetometers.

24. The method according to claim 23, wherein at least one Kalman filter is used for generating the estimate.

25. The method according to claim 19, wherein the azimuth measurement unit comprises one or more rotatable gyroscope units for azimuth measurements mounted within the housing, the rotatable gyroscope unit having a plurality of gyroscopes with input axes parallel to each other and configured to be rotatable so as to flip the input axes.

26. The method according to claim 25, wherein the rotatable gyroscope unit for azimuth measurements comprises ten or more gyroscopes so that the outputs from the ten or more gyroscopes take on a normal or quasi-normal distribution.

27. The method according to claim 25, wherein each of the gyroscopes in the one or more rotatable gyroscope units is a MEMS sensor.

28. The method according to claim 25, further comprising:
generating a single output data based on outputs from the plurality of gyroscopes for azimuth measurements included in each of the gyroscope units for azimuth measurements.

29. The method according to claim 28, further comprising averaging the outputs from the plurality of gyroscopes for azimuth measurements.

30. The method according to claim 28, further comprising generating an estimate of the single output data based on the outputs from the plurality of gyroscopes for azimuth measurements.

31. The method according to claim 30, wherein at least one Kalman filter is used for generating the estimate.

32. The method according to claim 19, wherein the azimuth measurement unit comprises a plurality of gyroscopes arranged on a surface of a spherical body, the gyroscopes having input axes aligned to mutually different directions.

33. A system for wellbore survey comprising:
a sensor apparatus;
a controller for controlling the sensor apparatus; and
a data processing unit for processing output data from the sensor apparatus,
wherein the sensor apparatus comprises:
a housing;
three gyroscope units oriented orthogonally respective to each other and mounted within the housing, each of the gyroscope units having a plurality of gyroscopes with input axes parallel to each other;
three accelerometer units oriented orthogonally respective to each other and mounted within the housing, each of the accelerometer units having a plurality of accelerometers with detection axes parallel to each other;
three gyroscope-output processors, each of the gyroscope-output processors generating a single output data based on the outputs from the plurality of gyroscopes included in each of the three gyroscope units;
three accelerometer-output processors, each of the accelerometer-output processors generating a single output data based on the outputs from the plurality of accelerometers included in each of the three accelerometer units;
three magnetometer units oriented orthogonally respective to each other and mounted within the housing, each of the magnetometer units having a plurality of magnetometers with detection axes parallel to each other;
three magnetometer-output processors, each of the magnetometer-output processors generating a single output data based on the outputs from the plurality of magnetometers included in each of the three magnetometer units,
one or more rotatable gyroscope units for azimuth measurements mounted within the housing, the rotatable gyroscope unit for azimuth measurements having a plurality of gyroscopes with input axes parallel to each other and configured to be rotatable so as to flip the input axes;
one or more gyroscope-output processors for azimuth measurements, each of the gyroscope-output processors for azimuth measurements generating a single output data based on the outputs from the plurality of gyroscopes for azimuth measurements included in each of the gyroscope units for azimuth measurements; and
a driver unit for rotating the rotatable gyroscope unit so as to flip the input axes, and
wherein the data processing unit determines attitude of the system based on the output data from the three gyroscope-output processors for measurements of rotation rates, the three accelerometer-output processors and the three magnetometer-output processors while traveling the system in the wellbore, when the outputs from the plurality of magnetometers is available, and
wherein the data processing unit determines the attitude based on the output data from the three gyroscope-output processors for measurements of rotation rates, the three accelerometer-output processors and the one or more gyroscope-output processors for azimuth measurements under a stationary condition of the system, when the outputs from the plurality of magnetometers is not available.

34. The system according to claim 33, wherein the data processing unit determines an azimuth of a target direction relative to north direction on a horizontal plane perpendicular to a gravity direction based on the output data from the three accelerometer-output processors and the output data from the three gyroscope units.

35. The system according to claim 34, wherein
the data processing unit determines the horizontal plane perpendicular based on the output data from the three accelerometer units;
the data processing unit determines earth rate components based on the output data from the three gyroscope units;
the data processing unit determines the earth rate vector with respect to a predetermined orthogonal sensor coordinates based on the earth rate components; and the data processing unit determines the north direction by projecting the earth rate vector onto the horizontal plane.

36. The system according to claim 35, wherein
each of the three gyroscope-output processors generates a first output data for each of the three gyroscope units with an input axis aligned to an first angular orientation;
each of the three gyroscope-output processors generates a second output data for each of the two or three gyroscope units with the input axis flipped to a second angular orientation opposite to the first angular orientation after generating the first output data; and
the data processing unit determines an earth rate component at the first angular orientation based on a difference between the first output data and the second output data to cancel out bias of the three gyroscope units.

37. The system according to claim 33, wherein the data processing unit determines attitude and position of the system based on the output data from the three gyroscope-output processors and three accelerometer-output processors.

38. The system according to claim 37, wherein the data processing unit determines gravity direction based on the output data from the three accelerometer-output processors, and
the data processing unit corrects the attitude based on the gravity direction.

39. The system according to claim 37, wherein the sensor apparatus further comprises a three-axis gravity sensor for sensing gravity direction with respect to mutually orthogonal three axes, and
the data processing unit determines gravity direction based on the outputs from the gravity sensor and corrects the attitude based on the gravity direction.

40. The system according to claim 33, wherein the sensor apparatus further comprises:
three magnetometer units oriented orthogonally respective to each other and mounted within the housing, each of the magnetometer units having a plurality of magnetometers with detection axes parallel to each other, and
three magnetometer-output processors, each of the magnetometer-output processors generating a single output data based on the outputs from the plurality of magnetometers included in each of the three magnetometer units, and
wherein the data processing unit determines attitude of the system based on the output data from the three gyroscope-output processors, the three accelerometer-output processors and the three magnetometer-output processors.

41. The system according to claim 33, wherein the sensor apparatus further comprises:
one or more rotatable gyroscope units for azimuth measurements mounted within the housing, the rotatable gyroscope unit for azimuth measurements having a plurality of gyroscopes with input axes parallel to each other and configured to be rotatable so as to flip the input axes;
one or more gyroscope-output processors for azimuth measurements, each of the gyroscope-output processors for azimuth measurements generating a single output data based on the outputs from the plurality of gyroscopes for azimuth measurements included in each of the gyroscope units for azimuth measurements; and
a driver unit for rotating the rotatable gyroscope unit so as to flip the input axes, and
wherein the data processing unit determines attitude of the system based on the output data from the three gyroscope-output processors for measurements of rotation rates, the three accelerometer-output processors and the one or more gyroscope-output processors for azimuth measurements.

42. The system according to claim 33, wherein the data processing unit comprises a Kalman filter.

43. A system for wellbore survey comprising:
a sensor apparatus;
a controller for controlling the sensor apparatus;
a data processing unit for processing output data from the sensor apparatus; and
a cable measurement unit for measuring length of a cable connected to the system located under ground,
wherein the sensor apparatus comprises:
a housing;
three gyroscope units oriented orthogonally respective to each other and mounted within the housing, each of the gyroscope units having a plurality of gyroscopes with input axes parallel to each other;
three accelerometer units oriented orthogonally respective to each other and mounted within the housing, each of the accelerometer units having a plurality of accelerometers with detection axes parallel to each other;
three gyroscope-output processors, each of the gyroscope-output processors generating a single output data based on the outputs from the plurality of gyroscopes included in each of the three gyroscope units; and
three accelerometer-output processors, each of the accelerometer-output processors generating a single output data based on the outputs from the plurality of accelerometers included in each of the three accelerometer units, and
an azimuth measurement unit for measuring azimuth with respect to mutually orthogonal three axes,
wherein the data processing unit determines attitude of the system based on the output data from the three gyroscope-output processors, the output data from the three accelerometer-output processors and the azimuth measured by the azimuth measurement unit, and
wherein the data processing unit determines trajectory of the system under the ground based on the output data from the three gyroscope-output processors, the output data from the three accelerometer-output processors, the azimuth measured by the azimuth measurement unit and the cable length measured by the cable-length measurement unit.

* * * * *